United States Patent [19]

Skostins

[11] Patent Number: 4,640,951

[45] Date of Patent: Feb. 3, 1987

[54] METHOD OF MANUFACTURE OF FIBER REINFORCED SILICONE ELASTOMER

[75] Inventor: Olgerts Skostins, Midland, Mich.

[73] Assignee: Dow Corning Corporation, Midland, Mich.

[21] Appl. No.: 838,842

[22] Filed: Mar. 12, 1986

[51] Int. Cl.$^4$ .............................................. C08K 3/36
[52] U.S. Cl. .................................... 524/266; 524/538; 524/588
[58] Field of Search ................................ 524/266, 588

[56] References Cited

U.S. PATENT DOCUMENTS

| | | | |
|---|---|---|---|
| 3,219,726 | 11/1965 | Bailey et al. | 260/825 |
| 3,623,904 | 11/1971 | Ramseyer | 117/135.1 |
| 3,919,161 | 11/1975 | Glaister et al. | 524/588 |
| 3,941,741 | 3/1976 | De Zuba et al. | 524/266 |
| 4,052,357 | 10/1977 | Marinik | 524/266 |
| 4,279,783 | 7/1981 | Kehrer et al. | 252/511 |
| 4,529,741 | 7/1985 | Bauman et al. | 521/99 |

*Primary Examiner*—Lewis T. Jacobs
*Attorney, Agent, or Firm*—Edward C. Elliott

[57] ABSTRACT

The method of this invention admixes in a high shear mixer 100 parts by weight of polydiorganosiloxane gum plasticizer chopped organic or inorganic fibers, and then when the fibers are uniformly mixed from 1 to 60 parts of reinforcing silica filler. The uniform mixture is then heated with mixing, under vacuum, optionally with nitrogen containing catalyst, to treat the filler and remove any volatiles, then cooled to give a uniform mixture with the fibers well dispersed throughout the mixture.

7 Claims, No Drawings

METHOD OF MANUFACTURE OF FIBER REINFORCED SILICONE ELASTOMER

BACKGROUND OF THE INVENTION

1. Field of the Invention

This invention relates to the reinforcement of heat cured silicone rubber through the use of fiberous reinforcement.

2. Background Information

The manufacture of silicone rubber which is cured through the use of heat is well known in the art. The use of reinforcing and non-reinforcing materials as ingredients in these types of rubber is also well known. For example, U.S. Pat. No. 3,219,726, issued Nov. 23, 1965, to Bailey et al. discloses a list of suitable filler materials. U.S. Pat. No. 3,623,904, issued Nov. 30, 1971, teaches an ablative coating which contains fibers melting above 3000° F., ranging in length from 30 micrometers to 25 millimeters. They teach the fibers are preferably added as one of the last components in the mixing process. The use of electrically conductive fibers in a low viscosity silicone mixture is taught by U.S. Pat. No. 4,279,783, issued July 21, 1981 to Kehrer and Smith. A composition of low viscosity polydiorganosiloxane that cures upon exposure to moisture, silica, blowing agent, and fiberous filler is used to produce foams as taught in U.S. Pat. No. 4,529,741, issued July 16, 1985.

SUMMARY OF THE INVENTION

The method of this invention admixes chopped reinforcing fibers, polydiorganosiloxane gum, and polydiorganosiloxane plasticizer to obtain a uniform mixture, then adds reinforcing silica filler and catalyst and heats the mixture under vacuum to yield a silicone elastomer base having the fibers uniformly distributed throughout.

It is an object of this invention to produce a fiber reinforced silicone elastomer base having the fibers distributed uniformly throughout the base.

DESCRIPTION OF THE INVENTION

This invention relates to a method of producing a fiber reinforced silicone elastomer base consisting essentially of (A) admixing in a high shear mixer, (1) 100 parts by weight of a polydiorganosiloxane gum, (2) from 0.1 to 5.0 parts by weight of polydiorganosiloxane plasticizer per 10 parts by weight of filler (4), (3) chopped organic or inorganic reinforcing fibers, and when the above is uniformly mixed, (4) from 1 to 60 parts by weight of reinforcing silica filler, and then (B) adding a small amount of a nitrogen containing catalyst and (C) heating with mixing under vacuum to treat the filler in situ and remove any volatiles, then (D) cooling and storing.

When it was attempted to add fibers to a silicone rubber base in order to provide reinforcement to the finished silicone rubber, it was found that the fibers could not be milled into the base to obtain a uniform mixture. The fibers would not disperse through the base, but tended to remain in clumps. A method of obtaining a uniform mixture was then worked on, resulting in the above method.

The polydiorganosiloxane gum (1) is well known in the art as the basis for silicone rubber. The gums consist of repeating diorganosiloxane units of the formula $RR'SiO_{0.5}$ where R and R' are monovalent hydrocarbon or halohydrocarbon radicals, usually of from 1 to 7 carbon atoms. The gums can be illustrated by those polymers, copolymers, and mixtures thereof wherein the repeating units are represented by dimethylsiloxane, phenylmethylsiloxane, diphenylsiloxane, methylvinylsiloxane, phenylvinylsiloxane, and 3,3,3-trifluoropropylmethylsiloxane units. The polydiorganosiloxane gums can have an average of 1.98 to 2.002 silicon bonded organic radicals per silicon atom with the terminating units being triorganosiloxy units, hydroxyl groups, alkoxy groups, or being endblocked with catalyst residue from the polymerization process. The triorganosiloxy units can be illustrated by trimethylsiloxy, dimethylvinylsiloxy, methylphenylvinylsiloxy, methyldiphenylsiloxy, and 3,3,3-trifluoropropyldimethylsiloxy, and the like. The gums can be prepared by well known methods such as the alkaline polymerization method described by Hyde in U.S. Pat. No. 2,490,357, issued Dec. 6, 1949. Other processes are described by Warrick in U.S. Pat. No. 2,634,252, issued Apr. 7, 1953, by Hyde in U.S. Pat. No. 2,634,284, issued Apr. 7, 1953, and by Johannson in U.S. Pat. No. 3,002,951, issued Oct. 3, 1961. Preferred are gums having greater than 50 percent of the radicals present as methyl radicals. The gums have a viscosity of greater than 1000 Pa.s at 25° C.

The polydiorganosiloxane plasticizer (2) is added to the composition to react with the silica filler (4) to prevent the crepe hardening of the mixture upon storage. Plasticizers for use in silicone rubber gum reinforced with silica are well known in the art. They are preferably short chain hydroxyl endblocked polydiorganosiloxanes. U.S. Pat. No. 2,875,172, issued Feb. 24, 1959 discloses use of diphenylsiloxanediol. U.S. Pat. No. 2,890,188, issued June 9, 1959, discloses use of hydroxylated organosiloxanes having from 1 silicon bonded hydroxyl per 70 silicon atoms to 2 silicon bonded hydroxyls per silicon atom. The radicals in the hydroxylated organosiloxane include both alkyl radicals and monocyclicaryl hydrocarbon radicals, with preferred radicals being hydroxylated dimethylpolysiloxane, hydroxylated methylphenylpolysiloxane, and hydroxylated methylvinylpolysiloxane. The hydroxylated organosiloxanes include hydroxylated copolymers of the above polysiloxanes, and mixtures of any of the above. The above patents are incorporated by reference to show plasticizers and their method of manufacture.

The chopped organic or inorganic fibers useful in the method of this invention are thought to include any of the heat stable fibers which are compatible with silicone rubber, such as polyester, glass, carbon, and aramide. The preferred fibers are aramide fibers such as those sold by E. I. duPont de Nemours and Co. Inc. under the tradename Kevlar. The fibers are chopped into pieces before mixing, preferably of a length of from 1 to 5 millimeters, more preferably about 3 millimeters. This length was found to disperse uniformly throughout the mixture when the method of this invention was followed, at the same time providing reinforcement and green strength to the uncured mixture and higher durometer, and tear strength to the cured silicone rubber.

The silicone elastomer base produced by the method of this invention contains from 1 to 60 parts by weight of reinforcing silica filler. These reinforcing silica fillers, well known in the art of silicone rubber, are silicas which have a surface area of greater than 50 $m^2/g$. These reinforcing silicas can be obtained commercially. They are most often produced by the burning of silanes, for example silicon tetrachloride. The preferred silicas have surface areas of from 200 to 400 $m^2/g$. The surface of the silica normally contains Si—OH groups as well as Si—O—Si groups. A certain amount of water may be absorbed on the surface. The silica may also be treated to change its surface to make it more inert, so that it does not react with the polydiorganosiloxane gum and cause the mixture to crepe harden upon standing. Such treated silicas are shown in U.S. Pat. No. 3,024,126, issued Mar. 6, 1962, U.S. Pat. No. 3,635,743, issued Jan. 18, 1972, and in U.S. Pat. No. 4,116,919, issued Sept. 26, 1978, all being incorporated by reference to illustrate silica filler and treated silica filler and how to manufacture it. In some applications reinforcing silica can also be silica which is obtained by a precipitation process, such precipitated silicas being commercially available.

The reaction between the reinforcing silica filler (4) and the polydiorganosiloxane plasticizer (2) is optionally catalyzed with a nitrogen containing material, such as the ammonium carbonate or ammonium bicarbonate taught in U.S. Pat. No. 3,268,473, issued Aug. 23, 1966, which patent is hereby incorporated by reference to show the nitrogen containing catalyst and its method of use.

The method of this invention first mixes polydiorganosiloxane gum (1), plasticizer (2) and chopped fibers (3) in a high shear mixer, preferably a dough mixer that can be closed so that the contents can be heated and placed under a vacuum. The fibers are added slowly to the mixture of gum and plasticizer with mixing until the fibers are uniformly dispersed throughout the mixture. Then the silica reinforcing filler and the optional nitrogen containing catalyst are added and the mixture is heated to react the silica and plasticizer. The preferred temperature of reaction is from 100° C. to 175° C. with the higher temperature preferred as the reaction is faster at higher temperatures. It is preferred that a nitrogen containing catalyst such as ammonium carbonate be added before heating as the reaction is then much quicker. A reaction time of from 1 to 4 hours at 175° C. has been found adequate. During the heating time, it is preferred to have a vacuum upon the mixture to remove any volatile materials which may be present. After the mixture has reacted, it is cooled and stored for use.

The fiber reinforced silicone elastomeric base produced by the method of this invention is used to produce silicone rubber by adding a catalyst, such as one of the well known organic peroxides such as 2,4-dichlorobenzoyl peroxide or 2,5,bis(tert-butylperoxy)-2,5-dimethylhexane, molding to the desired shape, and heating to cure the mixture to an elastomer. Because of the reinforcing fiber in the elastomer, it will have a higher durometer, a lower amount of stretch and a higher tear strength than it would have without the fibers.

The following examples are included for illustrative purposes only and should not be construed as limiting the invention, which is properly set forth in the appended claims. All parts are parts by weight.

COMPARATIVE EXAMPLE

A silicone rubber base was prepared by mixing in a dough mixer, 57 parts of dimethylvinylsiloxy endblocked polydimethylsiloxane having a Williams plasticity number of about 80, 40 parts of polydiorganosiloxane gum having about 0.14 mol percent vinyl radicals and the rest methyl radicals with dimethylvinylsiloxy endblockers and a Williams Plasticity of about 150, 3 parts of polydimethylsiloxane gum having hydroxyl endblocker and a Williams Plasticity of about 170, 12 parts of hydroxyl endblocked polydimethylsiloxane fluid having a viscosity of about 0.04 Pa.s at 25° C. and about 4 weight percent silicon-bonded hydroxyl radicals, 1.5 parts of hydroxyl endblocked polydiorganosiloxane having methyl and vinyl radicals and having about 10 weight percent vinyl radical and about 16 weight percent hydroxyl radical, 54 parts of fume silica having a surface area of about 250 m$^2$/g, heat stability additive, acid acceptor, and ammonium carbonate catalyst to aid the treatment of the silica with the polydimethylsiloxane fluid. The mixture was heated to 175° C. with mixing until uniform and a vacuum was drawn to remove volatiles, then the mixture was cooled.

A curable composition was prepared by placing 100 parts of the above base in a dough mixer, admixing in 100 parts of ground quartz having an average particle size of about 5 micrometers, 1 part of aramide fiber chopped to an average length of 3 mm (Kevlar, obtained from E. I. duPont de Nemours and Co. Inc.), and 1 part of catalyst of 50 percent 2,5 bis(tertbutylperoxy)-2,5-dimethyl hexane in powdered carrier. In spite of an excessive mixing time, a uniform mixture could not be obtained, as the fibers would not disperse uniformly in the rest of the mixture.

EXAMPLE 1

A series of compositions were prepared, using different amounts of fiber, in a different method of preparation in order to obtain a uniform dispersion of the fibers.

A dough mixer was loaded with 50 parts of dimethylvinylsiloxy endblocked polydimethylsiloxane having a Williams Plasticity number of about 80, 48 parts of polydiorganosiloxane gum having about 0.14 mol percent vinyl radicals and the rest methyl radicals with dimethylvinylsiloxy endblockers and a Williams Plasticity of about 150, 2 parts of hydroxyl endblocked polydimethylsiloxane having a Williams Plasticity number of about 152, 6 parts of hydroxyl endblocked polydimethylsiloxane fluid having a viscosity of about 0.04 Pa.s at 25° C. and about 4 weight percent silicon-bonded hydroxyl radicals, 4 parts of hydroxyl endblocked polymethylphenylsiloxane having a viscosity of about 0.5 Pa.s at 25° C. and about 4.5 weight percent silicon-bonded hydroxyl radicals, and 0.75 part of hydroxyl endblocked polymethylvinylsiloxane having about 4 weight percent hydroxyl radical. These were mixed and then the amounts of aramide fiber noted in Table 1 were admixed into the polymers. After a uniform dispersion was obtained, 42 parts of fume silica having a surface area of about 250 m$^2$/g was admixed in increments so that it gave a uniform dispersion. Then 0.75 part of heat stability additive and 0.025 part of ammonium carbonate catalyst were admixed in and the mixer was sealed and the contents heated to 175° C. for one hour under a vacuum to obtain a uniform mixture and remove any volatiles.

Then 100 parts of the base was admixed with 1 part of the peroxide catalyst. The mixture was a uniform mixture with all of the ingredients uniformly distributed throughout.

The catalyzed composition was cold molded into sheets of 1.9 mm thickness and cut into tensile bars and the load necessary to stretch the samples to failure was measured as shown in the table under green strength. The Williams Plasticity Number was also determined to show the stiffness of the composition, being tested in accordance with ASTM D 926. Then the sample was molded in a press at 170° C. for 10 minutes to produce vulcanized sheets, which were cut into test samples and measured in accordance with ASTM D 2240 for durometer, ASTM D 412 for tensile strength and Elongation, and ASTM D 24 for tear strength. The results are shown in Table 1.

TABLE 1

| Kevlar Fiber parts | Green Strength MPa | Williams Plasticity | Durometer | Tensile Strength MPa | Elongation percent | Tear Strength kN/m |
|---|---|---|---|---|---|---|
| 0.0 | 0.04 | 264 | 57 | 9.92 | 470 | 16.8 |
| 0.5 | 0.13 | 302 | 62 | 8.82 | 430 | 22.6 |
| 1.0 | 0.17 | 292 | 64 | 8.34 | 410 | 23.6 |
| 2.0 | 0.28 | 386 | 66 | 8.78 | 430 | 29.4 |

EXAMPLE 2

The above base was admixed with the parts of aramide fiber shown in Table 2, 60 parts of ground quartz and 1 part of the peroxide catalyst and then molded and tested with the results shown in Table 2.

TABLE 2

| Kevlar Fiber parts | Green Strength MPa | Williams Plasticity | Durometer | Tensile Strength MPa | Elongation percent | Tear Strength kN/m |
|---|---|---|---|---|---|---|
| 0.5 | — | 401 | 73 | 7.12 | 220 | — |
| 1.0 | — | 409 | 73 | 7.34 | 230 | — |

That which is claimed is:

1. A method of producing a fiber reinforced silicone elastomer base consisting essentially of
   (A) admixing in a high shear mixer,
      (1) 100 parts by weight of a polydiorganosiloxane gum,
      (2) from 0.1 to 5.0 parts by weight of polydiorganosiloxane plasticizer per 10 parts by weight of filler (4),
      (3) chopped organic or inorganic reinforcing fibers, and when the above is uniformly mixed,
      (4) from 1 to 60 parts by weight of reinforcing silica filler, and then
   (B) optionally adding a small amount of a nitrogen containing catalyst and
   (C) heating with mixing under vacuum to treat the filler in situ and remove any volatiles, then
   (D) cooling and storing.

2. The method of claim 1 in which the polydiorganosiloxane gum is at least 50 percent methyl radicals and has a viscosity of greater than 1000 Pa.s at 25° C.

3. The method of claim 1 in which the polydiorganosiloxane plasticizer is a short chain hydroxyl endblocked polydiorganosiloxane.

4. The method of claim 1 in which the fibers of (3) are from 1 to 5 millimeters in length.

5. The method of claim 4 in which the fibers are aramide fibers.

6. The fiber reinforced silicone elastomer base produced by the method of claim 1.

7. The fiber reinforced silicone elastomer base produced by the method of claim 5.

* * * * *